July 28, 1942.  A. R. SQUYER  2,291,114
HEADLIGHT TESTER
Filed July 17, 1940  5 Sheets-Sheet 3
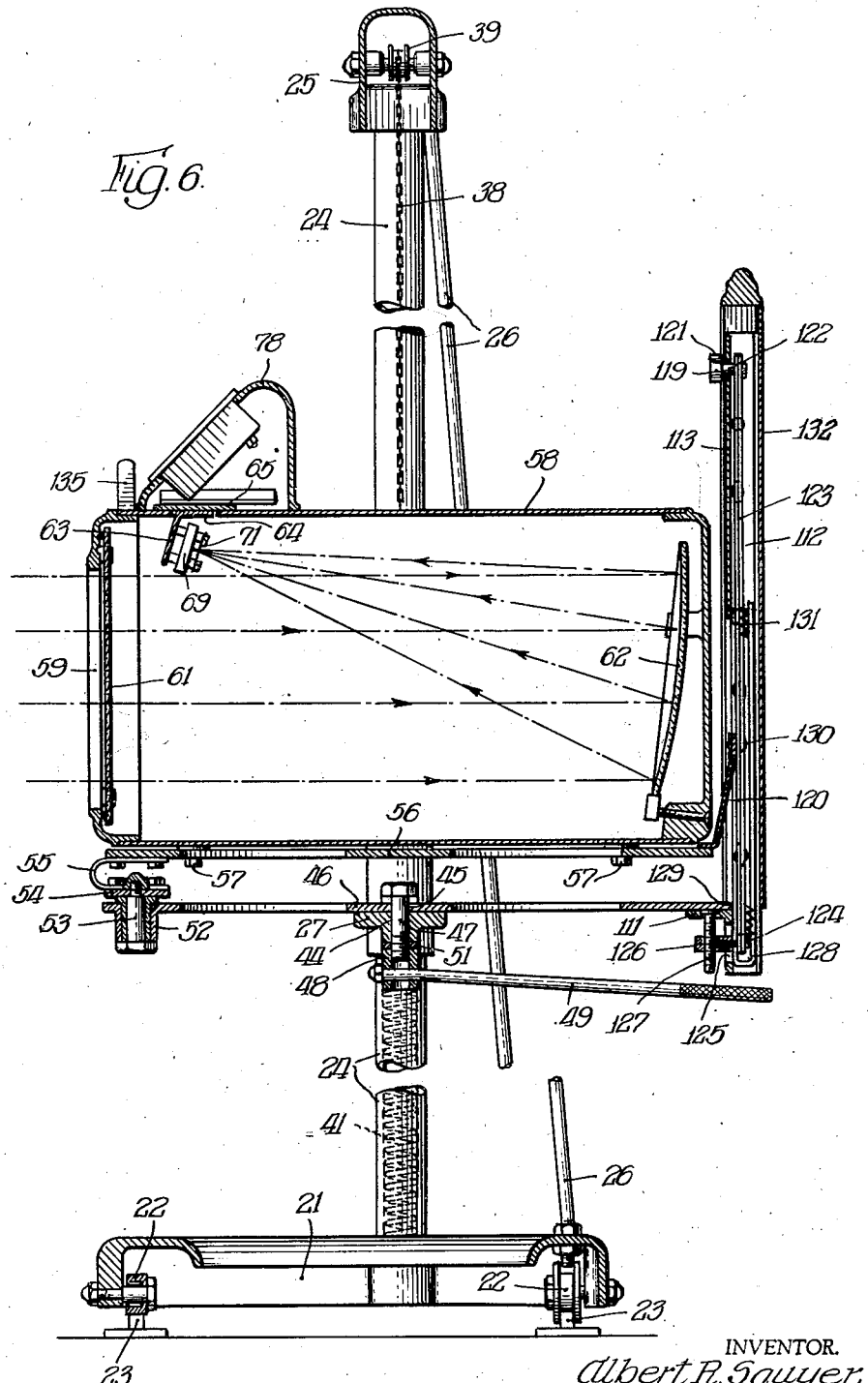

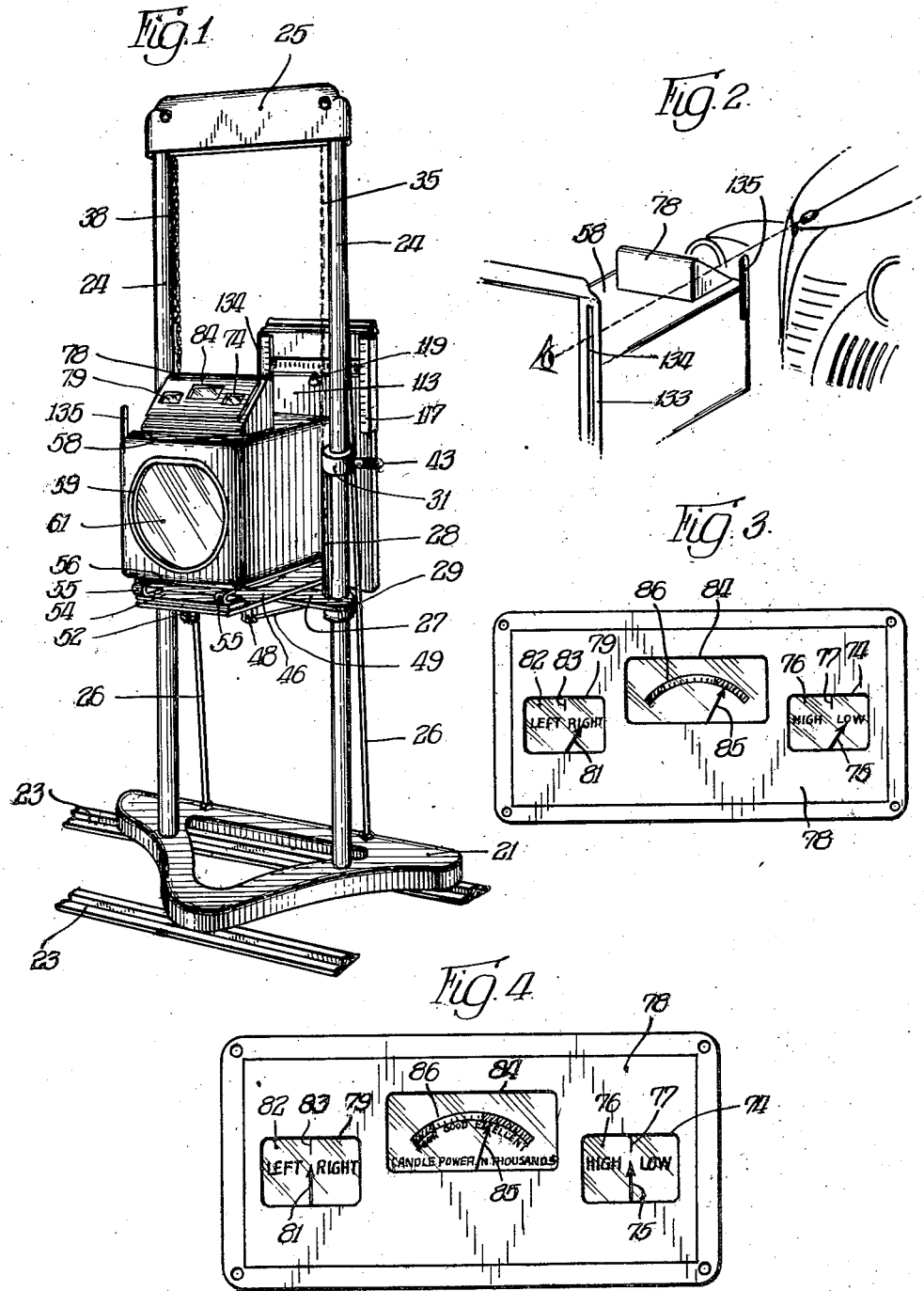

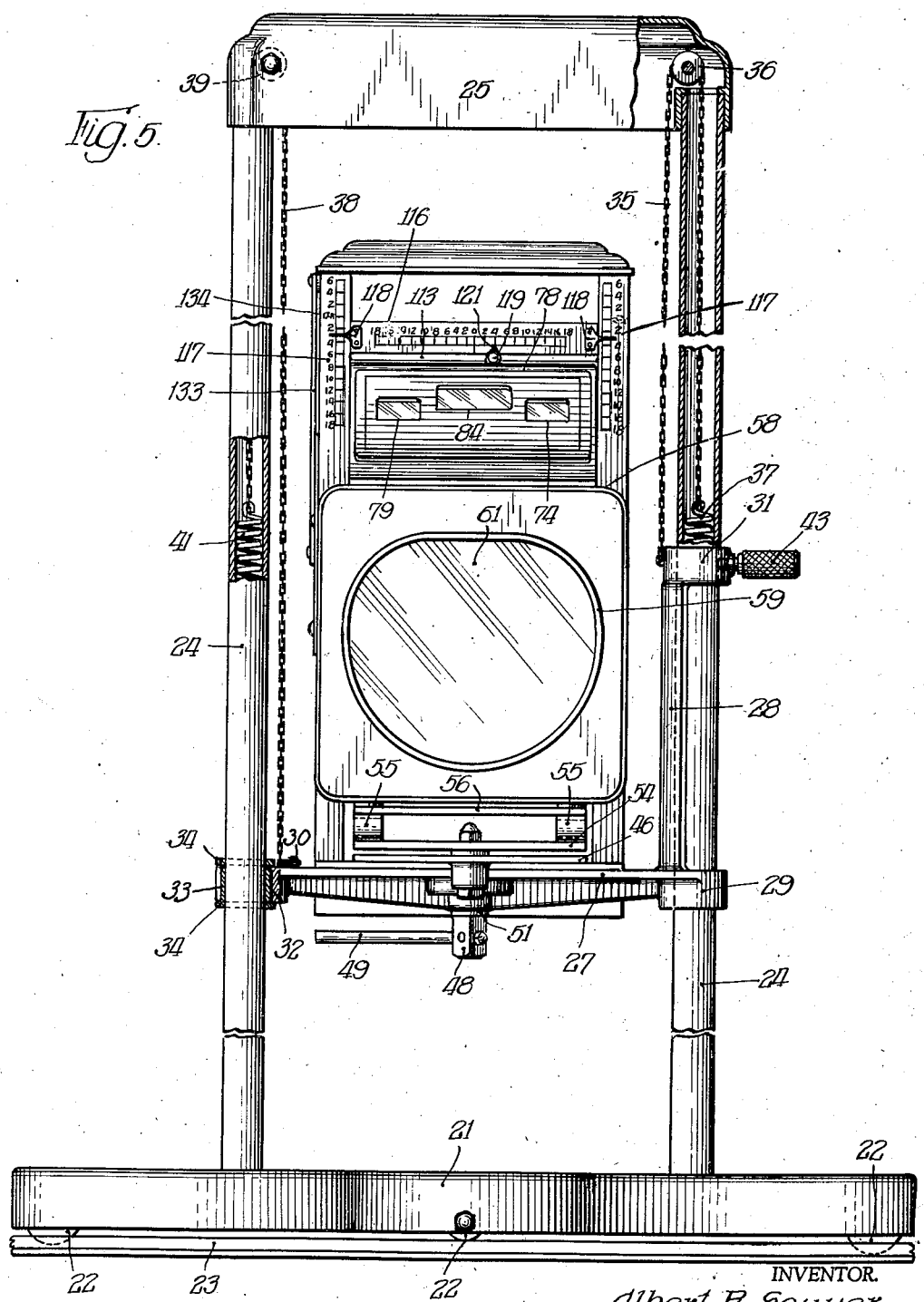

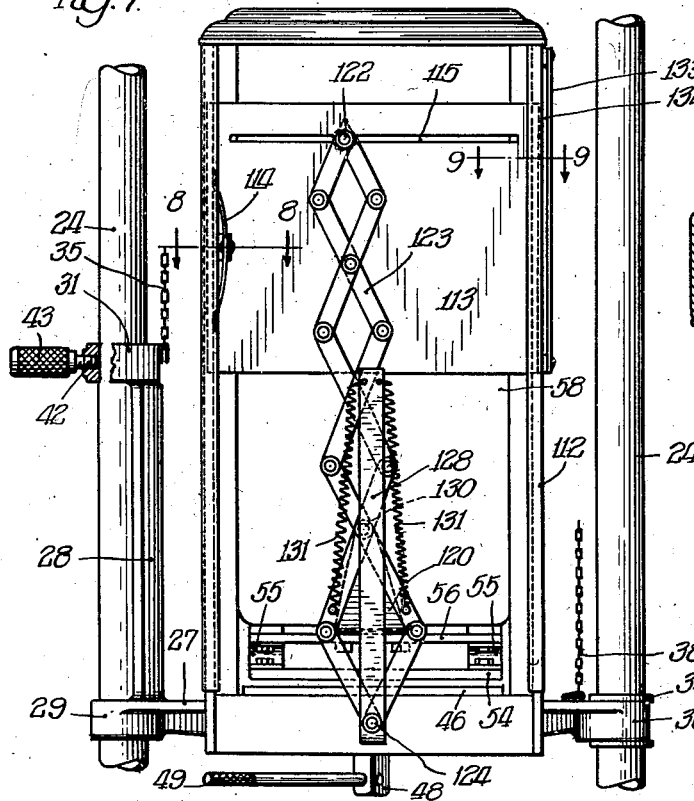
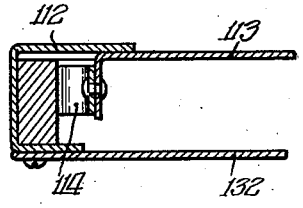
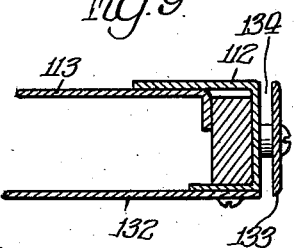
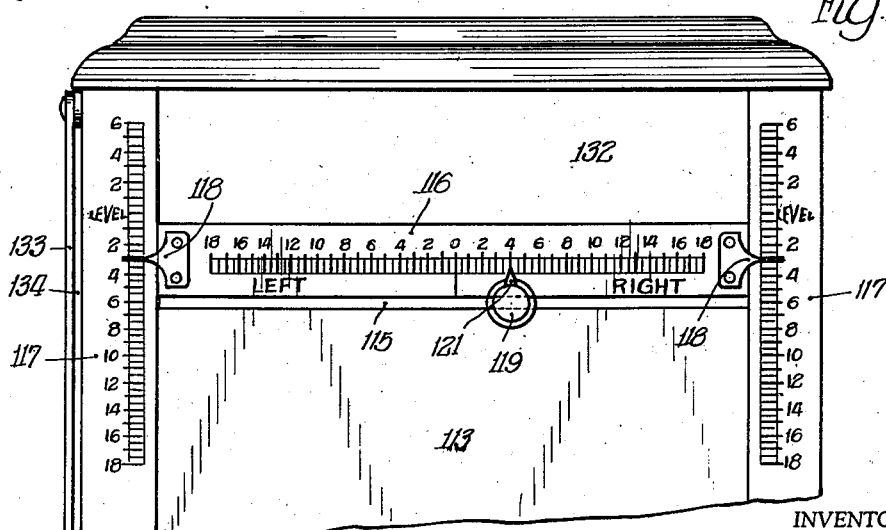

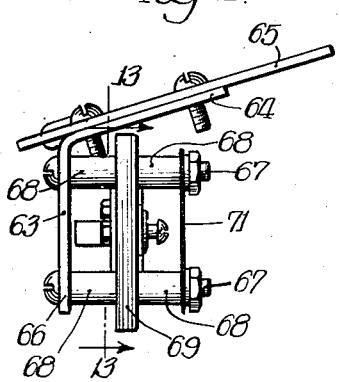
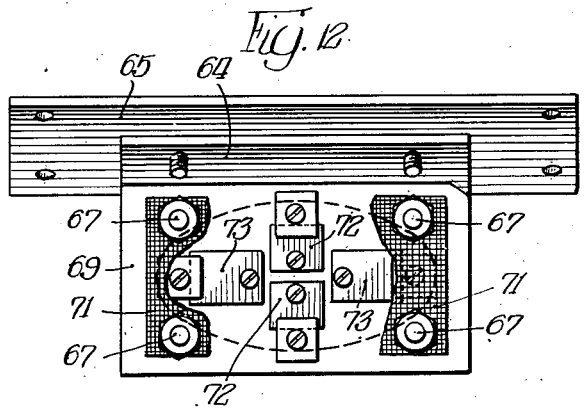
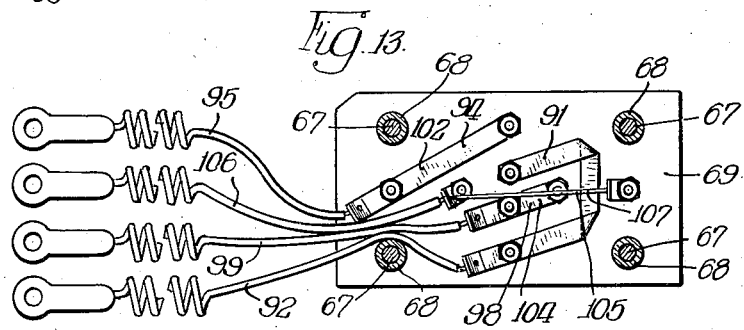
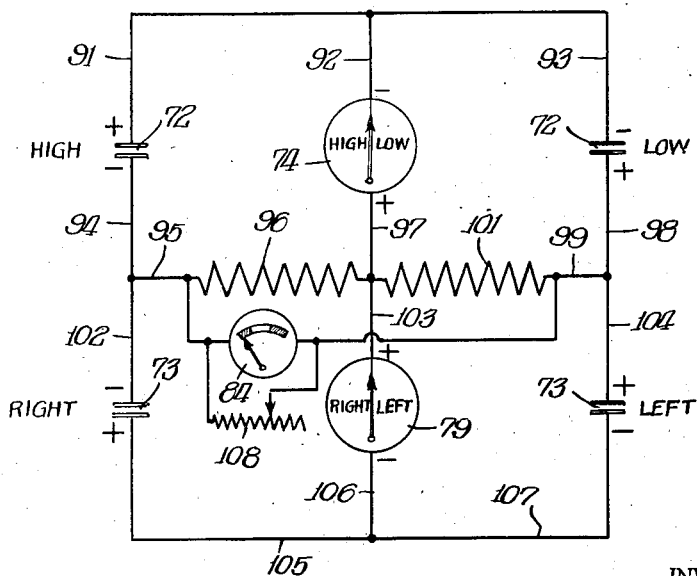

Patented July 28, 1942

2,291,114

UNITED STATES PATENT OFFICE 2,291,114

HEADLIGHT TESTER

Albert R. Squyer, Springfield, Ill., assignor to Weaver Manufacturing Company, Springfield, Ill., a corporation of Illinois Application July 17, 1940, Serial No. 345,916

13 Claims. (Cl. 88—14)

Due to the fact that the present, relatively-rapid driving-speeds of motor-vehicles have created a demand or requirement for safety, this, of course, including the proper aim and power of the headlamps of the vehicle, and, since many of the fatal automobile accidents occur at night by reason, in large measure, or in many cases, of the driver's inability to see clearly enough and sufficiently far down the road, the current invention provides means for reliably testing lamps of automobiles to determine and/or to provide for the adjustment of the aim of the light-beam issuing from each lamp and to ascertain the candle-power thereof.

One outstanding purpose of this invention is, therefore, to supply a suitable appliance for the facile detection of weak and improperly-directed headlights whereby to increase the safety of night driving and to assist the chauffeur in the correct driving of the car.

An object of the invention is to provide a headlight-tester which conserves floor-space and which simplifies the work of testing headlights so that those of a car can be examined and adjusted, if necessary, in a few minutes.

A design of the invention is to supply an apparatus of this character which is highly accurate for scanning the pattern of the light-beam by photoelectric-cells associated with suitable dials of measuring instruments, the dials of which indicate the degree of intensity of light on the light-sensitive cells.

The vertical aim of the light-beam, its lateral aim and its intensity or candle-power are shown by the dials or faces of three electric-meters connected to properly positioned or grouped photoelectric-cells, which are highly sensitive to the slightest tilt of the headlight, whereby the operator need not guess at the top or center of the beam, the meter-dials being in full view before him.

The plurality of photoelectric-cells are balanced, and, in a sense, they are made to find the true geometric center of the beam which must be determined for exact aiming, thus eliminating the use of the human eye to select the indefinite top or center of the beam.

Suitable scales are provided to show the aim of the headlight as is, and to permit its change, if necessary, to what it should be to meet legal requirements.

The new headlight-tester uses no lens through which chromatic and rectilinear aberration would somewhat distort the beam, but rather it incorporates a highly-accurate concave-mirror reflector to condense the beam and to direct it on to the photoelectric-cells, although in its broader aspect the invention is not limited to the employment of such particular type of reflector.

In general, the new headlight-tester in substantial measure removes the employment of the variable and more or less uncertain human element, it is extremely precise in its results, it finds the exact beam-center, it can be operated rapidly, its use involves no guesswork, it is easy and simple to employ, it comprises but few parts, it is unlikely to become deranged or damaged in ordinary service, and it can be employed satisfactorily with all types of headlights from the earliest to those of the present day sealed-beam type.

To the accomplishment of the aforesaid and other purposes and aims of the invention, a present preferred embodiment thereof has been produced and illustrated in the accompanying drawings, to which reference should be had in connection with the following detailed description, and in the views of such drawings like reference numerals have been employed to designate the same parts of the structure.

In the drawings—

Figure 1 is a perspective view of the novel and improved headlight-tester with its relatively-long rails or tracks shown as broken off at both ends;

Figure 2 illustrates a part of the apparatus and indicates the way it is sighted with relation to the car, the headlights of which are to be examined;

Figure 3 is a front view of the faces or dials of the three electric-meters actuated by the currents generated by the photoelectric-cells;

Figure 4 presents the same with the needles of the two direction-meters showing that their respective photoelectric-cells are equally illuminated or balanced;

Figure 5 is a front elevation of the headlight-tester with a few parts broken away;

Figure 6 is a central vertical section through the appliance;

Figure 7 is a rear elevation of a portion of the apparatus with the back cover-plate removed;

Figure 8 is an enlarged, horizontal section on line 8—8 of Figure 7;

Figure 9 is a similar section on line 9—9 of Figure 7;

Figure 10 shows the graduated direction-scales on a large scale;

Figure 11 is an edge-view of the mounting for the photoelectric-cells and their heat-protective screen;

Figure 12 is a face view of such cells and their mounting with the screen partly broken away and the headlight-beam depicted in an oval-line;

Figure 13 is a back view of the insulation-plate carrying the cells on its other side, this view presenting also the electric-terminal connections for the parts; and Figure 14 is a diagram of the electric-circuits and the parts incorporated therein.

Referring to the several views of these drawings, it will be observed that the present new appliance includes a base 21 equipped with carrying-wheels 22, 22 adapted to roll on a pair of parallel rails or tracks 23, 23 mounted in any approved manner on a smooth or plane floor which need not, however, necessarily be exactly horizontal throughout its extent, although the rails themselves should be horizontal.

Fixedly mounted on such base in any approved manner is a pair of upright, spaced-apart, hollow posts 24, 24 connected together at their upper ends by a hollow-casting 25, brace-rods 26, 26 also joining such base with the top casting for strengthening and stiffening purposes, all as will be readily understood.

Mounted between, and designed for vertical adjustment on, such upright posts, is a cross-bar 27 having an upward-extension 28 at one end, such cross-bar and associated extension having rigid therewith a pair of vertically-aligned bearings 29 and 31 receiving and slidable on the one post, the opposite end 30 of the cross-bar being slotted at 32 to accommodate a circular bearing-member 33 slidable on the other or companion post, such bearing element having at its opposite ends circular flanges 34, 34 which overlap the top and bottom surfaces of the cross-bar bordering the slot.

In order to counterbalance such cross-bar and the elements hereinafter described which it carries, a chain 35 is connected at its lower end to the bearing-element 31 and it extends up over a rotatable pulley or sheave 36, suitably mounted inside of the casting 25, and then down inside of the corresponding post where it is united to the upper end of a coiled spring 37, the lower end of which is appropriately anchored.

In similar manner, the cross-bar is connected to a chain 38 which passes upwardly and around a second pulley or sheave 39 inside of the top casting and in like manner has its end fastened to another counterbalancing spring 41 inside the complementary post and fixedly secured at its lower end.

In order to hold such cross-bar and the parts mounted thereon in any desired position of vertical adjustment on the standard composed of the elements hereinabove set forth, the bearing-member 31 is provided with a screw-threaded hole therethrough accommodating the threaded portion of a manually-operable set-screw 42 having a knurled handle 43 by which the screw may be readily tightened and loosened, the inner end of the screw being designed to engage the exterior surface of the post extending through the bearing.

Obviously, by loosening the set-screw, the cross-bar and its associated parts may be moved up or down on the standard and by tightening the screw, it may be maintained and held firmly in any desired position of vertical adjustment.

The center of the cross-bar is provided with a vertical hole 44 in register with a mating hole 45 of like size in a base-plate 46, the two aligned apertures accommodating a pivot-bolt 47, equipped on its lower portion with a tightening-nut 48 fitted with an operating-handle 49, a washer 51 being interposed between the cross-bar and the nut.

From what precedes, it will be apparent that, when the handle 49 is swung in one direction, it loosens the nut sufficiently so that plate 46 may be swung or adjusted angularly in its horizontal plane and in which position of adjustment it may be maintained by tightening the nut through the turning of the handle in the opposite direction.

At its front end base-plate 46 has a vertical-bearing 52 accommodating a vertical-pivot 53 fixed to and depending from the middle of a flat-bar 54 which, at its opposite ends, carries two U-shaped springs 55, the lower sections of which are fastened to bar 54 and the upper sections of which are secured to the front end of a substantially-horizontal, upper plate 56, the two plates 46 and 56 each having large openings therethrough to reduce their weight and in effect transforming them into frames.

This second plate 56 has secured thereto, as by bolts 57, 57, the bottom-wall of a metal box or container, characterized as a whole 58, the front-wall of such box having a window 59 preferably, but not necessarily, covered with a glass-pane 61 to prevent or restrict the entrance of dirt or moisture to the interior of such housing.

Mounted on the inside of the back-wall of such box or housing is a slightly-inclined, concave, reflecting-mirror 62 which is designed and arranged to receive the headlight-beam passing through the glass 61 and to condense and project it upwardly forwardly on to a group of photoelectric-cells mounted in the front, upper portion of the box somewhat above the window.

Such photoelectric-cell structure comprises a metal angle-bracket designated as a whole 63 and having a top-flange 64 in an opening in the top-wall of the box and held fixedly in position by being mounted on a plate 65 over such opening and fastened around the margin of such opening, the bracket also having a downwardly-sloping flange 66 carrying, by means of bolts 67, 67 and spacing-sleeves 68, 68, an insulation-plate 69 spaced forwardly of flange 66 and also carrying in front of, and spaced from, plate 69, a heat-dissipating metallic-screen 71 so that an undue amount of heat from the light-beam will not reach the light-sensitive photoelectric-cells.

Such insulation-block 69 on its face toward the concave-mirror carries four photoelectric-cells 72, 72 and 73, 73 arranged in pairs as shown, the two cells of each pair being balanced or of equal light-sensitivity.

It will be observed that the four photoelectric-cells are in the same inclined plane, with the two cells 72, 72 above and below one another and the two cells 73, 73 arranged at right-angles thereto or horizontally.

Again, it will be perceived that the two cells of each pair are at equal distances from a center common to all four, which, of course, is midway between the cells 72, 72 and likewise midway between the cells 73, 73.

Cells 72, 72 are employed to determine the aim of the headlight-beam vertically, whereas the companion cells 73, 73 are used to ascertain the aim of the headlight-beam laterally or sidewise.

The two companion cells 72, 72 are connected to an electric, high-low meter 74 equipped with a needle 75 operative over the meter face or dial 76 displaying a balance-index 77 and the words "High" and "Low" on opposite sides thereof, such meter occupying the front, right-hand portion of a supplemental-casing 78 mounted on the top-wall of the box.

In analogous manner, the two cells 73, 73 are operatively connected to a left-right electric-meter 79 having a needle 81 cooperating with a meter-face 82 supplied with a balance-index 83, and having the words "Left" and "Right" on opposite sides of such index, the meter occupying the left-hand portion of such supplemental-casing as viewed from the front of the instrument.

Between the two meters is a third candle-power electric-meter 84 whose needle or pointer 85 functions with a candle-power graduated scale 86 with the graduations from 0 to 5,000 shown in red and coupled with the word "Poor," those reading from 5,000 to 20,000 being in white and associated with the word "Good," while those reading from 20,000 to 50,000 are displayed in green and supplied with the word "Excellent."

The wiring of these photoelectric-cells and their meters and the accompanying resistances is as follows:

By conductors 91 and 92, the positive side of the "High" photoelectric-cell 72 is connected to the negative terminal of the high-low meter 74 and the negative side of the other or "Low" photoelectric-cell 72 is connected by wires 93 and 92 to the same terminal of meter 74.

The negative side of "High" cell 72 is connected to the other terminal of meter 74 by conductors 94 and 95, a suitable resistance 96, for example of 500 ohms, and a third conductor 97.

In similar manner, the positive side of "Low" cell 72 is connected to such second terminal of meter 74 by means of wires 98 and 99, another resistance 101 of 500 ohms, and conductor 97.

The negative side of the "Right" cell 73 is joined by a wire 102, conductor 95, resistance 96 and conductor 103 to the positive-terminal of the right-left meter 79, the positive side of the "Left" cell 73 being connected to the same terminal of meter 79 through conductor 104 and 99, resistance 101 and wire 103.

The positive side of the "Right" cell 73 is joined to the negative-terminal of meter 79 through conductors 105 and 106, and the negative-side of the "Left" cell is united with the negative-terminal of meter 79 through conductors 107 and 106.

From the electric-system thus presented, it will be clear that, if the two cells of either pair are equally illuminated, the needle of the corresponding meter will be in register with the balance index on its face or dial, whereas, if such cells are unequally illuminated, the fact will be readily perceived because the needle will indicate such unbalanced condition and will show which cell of the two is receiving the greater amount of light and which the lesser amount.

A total candle-power meter 84 is bridged across the two resistances 96 and 101 and is itself bridged in the usual manner for calibration by an adjustable resistance 108.

Obviously, by the arrangement described, meter 84 is influenced by the total amount of light played on the four cells and the scale on its face is calibrated or graduated to show the total candle-power of the whole beam of light.

It will be perceived, however, that by proper calibration of such meter-scale, two only of such cells need be connected to the meter, and, in fact, one cell could do the work, but by joining all four cells together, a somewhat greater degree of accuracy is obtained.

Fastened to the rear end of the under-side of the base-plate 46 is a cross-member 111 carrying an upright guide-frame 112 in the grooves of which is a vertically-adjustable metal plate or panel 113 frictionally held in any position of adjustment by a leaf-spring 114 mounted on the plate and bearing against an upright surface of the frame, such panel or plate near its top end having a transverse horizontal slot 115 above, adjacent to, and parallel with which on the front side of the plate is a horizontal scale 116 graduated in opposite directions, left and right, from a central zero index, such graduations desirably being in inches at twenty-five feet.

Frame 112 on its front face and overlapping the vertical margins of the adjustable panel 113 has along each of its borders a vertical-scale 117 also graduated in inches at twenty-five feet, each such scale being graduated from an intermediate position designated "level" and the graduation at three inches on each such scale below its graduation "level" is preferably red, whereas the other graduations are black.

Plate 113 near its top carries two pointers 118, 118 each cooperating with one of the scales 117, 117 as will be readily understood.

A manually-operable knob 119, carrying a pointer 121 cooperating with the graduations of the horizontal-scale 116, is mounted to move crosswise of plate 113 and along scale 116 by reason of a shank or stem 122 for the knob occupying and slidable in the horizontal-slot 115 of plate 113.

Such shank has rockingly connected thereto the upper end of a crossed-bar planograph-mechanism 123, the lower end of which is rockingly mounted at the center of the vertical element of cross-member 111 on a screw 124 occupying an upright-slot 125 in such vertical-member and being threaded into a square-nut 126 on a screw 127 mounted for rotation in the horizontal-element of member 111, such screw 124 extending through a hole in the short arm of a U-shaped bracket 128 bearing against the rear face of the vertical portion of member 111 and occupying a guiding-groove 129 in the back end of plate 46, the top end of the longer arm of such bracket being connected to a pair of coiled, contractile, counterbalancing springs 131, 131 secured at their lower ends to members of the planograph-device. Hinge-pin 130 (Fig. 7) of the motion-reducing planograph-mechanism 123 is mounted on the upper portion of a bracket 120 (Fig. 6) fixed to plate 56, whereby movement of knob 119 is transmitted in reduced degree to plate 56 and the parts which it carries.

Preferably, for appearance' sake, the construction within the upright-frame 112 is concealed from view by a rear cover-plate 132.

Along the upper portion of one side of frame 112, a bar 133 is mounted thereon parallel to the frame and with a slight space 134 between such bar and the adjacent portion of the frame, this constituting a vertical sighting space.

The corresponding side-wall of the box or housing 58 is supplied with an upstanding sighting-bar 135 which can be viewed through the space 134 to properly initially position the box and its contents with relation to the lengthwise dimension of the automobile whose lights are to be tested.

Headlight servicing requires more exactitude than most other types of examination or testing of an automobile, for example, if the aim of a headlight is only one degree off from what it should be, the beam of light is more than 5 feet out of line at a distance of 300 feet and this inaccuracy of aim of the light may throw the "hot-spot" or center of the beam off the road entirely or cause excessive glare to an oncomer.

To insure good work and to obtain the required precision in headlight-testing, the appliance must be properly installed and used in that the tester and car of which the lights are to be examined must be supported from the same plane, that is, the floor area on which the headlight-tester and car stand must be uniform, although it need not necessarily be level, and, once the tester has been calibrated to the plane of the floor, no other attention is necessary, provided the appliance is not tampered with as to its adjustment.

In operating the headlight-tester, the automobile to be examined is driven up to the appliance at as near a right-angle to the tracks or rails as is feasible and so that the headlight-lenses are about 12 inches from the front glass window of the tester-box, although the tester can be used at a distance of from 3 to 4 feet from the headlights, but, at such a distance, the candle-power meter reading decreases about 5 to 10%, and, for this reason, it is recommended that all testing be done with the headlight-lens from 1 to 24 inches from the front of the box.

Before undertaking the test or adjustment of the headlights, the car should be rocked to relieve any spring-tension, the tires should be inflated to the proper pressures, care should be observed that no one leans on the car-fenders while making adjustments, and the lamps should be adjusted with the car unloaded.

The present headlight-tester is a sensitive and accurately-performing instrument and for this reason the foregoing points should be carefully observed, since the least change in the position of the car which will also change the position of its lights will register on the meters of the appliance, although, as indicated above, the distance of the headlights from the tester is subject to substantial variation without material modification of the accomplishment of reliable results.

The instrument is moved along the rails until it is in front of the center of the car, then with the pointer 121 on the zero graduation of scale 116, handle 49 is turned to release its associated nut 48, whereupon the operator sights through the vertical aiming-slot 134, on the right-side of the upright frame as he faces the car, across the vertical stem sight 135 on the right front portion of the box and along the center line of the car's hood, this operation lining up the box and associated parts with the hood of the car, that is with a longitudinal dimension of the car, and upon completion of this, turning of handle 49 locks the box in the proper horizontal angular position for correct cooperative functioning with the headlights of the car.

From the foregoing, it will be clear that the box and its contained elements are much more easily correctly related to the automobile than the latter could be shifted for correct position with reference to the tester.

The instrument is then moved along the rails until it is directly in front of the headlight to be tested and it is adjusted to the proper height by sliding it up and down and watching the needle of the candle-power meter, and, when the point of highest reading is shown, the operator locks the tester in place by means of the manually-actuated set-screw 42.

With the high or driving beam of the headlamp active, the positions of the meter hands or pointers of both aiming "high-low" and "left-right" meters are noted.

Knob 119 is thereupon moved back and forth horizontally on its panel and the latter is shifted vertically by the knob until the pointers or hands of both direction-meters are on their center balance marks.

The readings on scales 116 and 117 now show respectively the lateral aim and inclination of the center of the beam.

For example, if the aiming meters read "Right" and "Low," then the knob should be moved to the right and downwardly until such balanced result is accomplished and the candle-power reading should be noted.

Pointer 121 of the knob shows on the horizontal scale 116 the side aim of the beam and both pointers 118 show on the vertical-scales 117 the up or down aim of the beam.

If these readings are not what they should be, then knob 119 is adjusted up or down, as the case may be, so that both vertical scales indicate the legal drop of the beam in inches at a distance of 25 feet, the standard aim recognized in all States of the United States, at the present time, a 3 inch drop in 25 feet from level and that is why such readings on the vertical scales are shown in red.

This having been accomplished, the knob is shifted sidewise until it depicts on the horizontal scale the correct lateral or side aim of the type of lamp with which the car is equipped, the standard side aim recognized in all States for dual-beam headlights, including sealed-beam but not asymmetric beam, is center of beam straight ahead, this being shown by zero on the scale.

When the lamps are adjusted so that the needles of both direction-meters are on their center or balance lines, they will be correctly aimed and have the maximum in candle-power reading.

Asymmetric headlamps always have their lenses marked "Right" and "Left" since they are not interchangeable and must be used with the lamp for which they are designed, it being well-known that with asymmetric type headlamps only one beam changes, the other remaining in the same position for both driving and passing.

In adjusting and aiming asymmetric headlamps, the operator must first discover which beam drops when passing and aim it straight ahead with the legal drop for that locality and then the stationary beam is aimed 13 inches to the right on the tester-scale.

As indicated above, in some cases, it is desirable to first ascertain the aim of the headlight-beam presented for servicing of the headlamp, but, if preferred, the tester can be set for the correct aim and the headlamp adjusted to conform to such specified and required direction without preliminarily ascertaining its present aim.

If preferred, the photoelectric-cells may be grouped around their common center so that they are all the same distance from such center, but the arrangement shown and described has certain advantages ordinarily, but not necessarily, worthy of preservation and use.

Other changes or modifications in the structure may be resorted to without departure from the invention as defined in the appended claims.

I claim:

1. In a headlight-tester incorporating cell-means sensitive to, and capable of generating an electric-current proportional to, the intensity of visible-light played thereon, optical-means to receive the light-beam from the headlamp to be tested and to project it in condensed form on said cell-means, an adjustable support on which said optical-means and said cell-means are mounted, the three elements constituting a unit adjustable as to its aim relative to the headlamp, graduated-means showing the various adjusted aim positions of said unit, an electric-circuit system in which said cell-means is included, and an electric-current-actuated indicating-means in said system, the combination of novel features being that said cell-means includes a pair of said cells of equal electric-current-generating sensitivity to visible-light located so that when the light-beam is projected on them by said optical-means the section of the light-beam received by one cell of the pair will be that in vertical register with the light-beam section received by the other cell of the pair, that said electric-circuit system, indicating-means and pair of cells are associated together whereby the electric-currents generated by said cells operate on said indicating-means in opposed relation, and that said indicating-means shows when both cells receive the same amount of light from the beam.

2. The novel features in headlight-testers set forth in claim 1 in combination with the additional novel feature that said indicating-means specifies the direction of adjustment of said cells, when not lighted in the same degree, to effect their equalized illumination.

3. The novel features in headlight-testers set forth in claim 1 in combination with the additional novel feature of a means connected to, and actuated by the electric-current generated by, at least one cell of said pair, graduated to show the total candle-power of the light-beam.

4. In a headlight-tester incorporating cell-means sensitive to, and capable of generating an electric-current proportional to, the intensity of visible-light played thereon, optical-means to receive the light-beam from the headlamp to be tested and to project it in condensed form on said cell-means, an adjustable support on which said optical-means and said cell-means are mounted, the three elements constituting a unit adjustable as to its aim relative to the headlamp, graduated-means showing the various adjusted aim positions of said unit, an electric-circuit system in which said cell-means is included, and an electric-current-actuated indicating-means in said system, the combination of novel features being that said cell-means includes a pair of said cells of equal electric-current-generating sensitivity to visible-light located so that when the light-beam is projected on them by said optical-means the section of the light-beam received by one cell of the pair will be that in horizontal register with the light-beam section received by the other cell of the pair, that said electric-circuit system, said indicating-means and said pair of cells are associated together whereby the electric-currents generated by said cells will operate on said indicating-means in opposed relation, said indicating-means showing when both cells receive the same amount of light from the beam.

5. The novel features in headlight-testers set forth in claim 4 in combination with the additional novel feature that said indicating-means specifies the direction of adjustment of said cells, when not lighted in the same degree, to effect their equalized illumination.

6. The novel features in headlight-testers set forth in claim 4 in combination with the additional novel feature of means connected to, and actuated by the electric-current generated by, at least one cell of said pair, graduated to show the total candle-power of the light-beam.

7. In a headlight-tester incorporating cell-means sensitive to, and capable of generating an electric-current proportional to, the intensity of visible-light played thereon, optical-means to receive the light-beam from the headlamp to be tested and to project it in condensed form on said cell-means, an adjustable support on which said optical-means and said cell-means are mounted, the three elements constituting a unit adjustable as to its aim relative to the headlamp, graduated-means showing the various adjusted aim positions of said unit, an electric-circuit system in which said cell-means is included, and an electric-current-actuated indicating-means in said system, the combination of novel features being that said cell-means includes a first-pair of said cells of equal electric-current-generating sensitivity to visible-light and a second pair of said cells of equal electric-current-generating sensitivity to visible-light, said cells being grouped symmetrically around a common center on the axis of said optical-means, said cells being so located that when the light-beam is projected on them by said optical-means, the light-beam section received by one cell of said first pair will be that in vertical register with the light-beam section received by the other cell of said first pair, and the light-beam section received by one cell of said second pair will be that in horizontal register with the light-beam section received by the other cell of said second pair, that said indicating-means includes two indicators one for each pair of cells, that said electric-circuit system, said indicators and said pairs of cells are associated together whereby the electric-currents generated by said first pair of cells operate on their indicator in opposed relation, whereby said electric-currents generated by said second pair of cells operate on their indicator in opposed relation, and that each indicator shows when both cells of its pair receive the same amount of light from the beam.

8. The novel features in headlight-testers set forth in claim 7 in combination with the additional novel feature that each indicator specifies the direction of adjustment of its pair of cells, when not lighted in the same degree, to effect their equalized illumination.

9. The novel features in headlight-testers set forth in claim 7 in combination with the additional novel feature of a third electrically-operated indicator in said system whereby said indicator is actuated by the four currents generated by the two pairs of cells, said third indicator being graduated to show the total candle-power of the light-beam.

10. The novel features in headlight-testers set forth in claim 7 in combination with the additional novel feature that said optical-means is a concave-mirror avoiding the inherent chromatic and rectilinear aberration of a convex-lens.

11. The novel features in headlight-testers set forth in claim 7 in combination with the additional novel features of means to adjust the aim of said unit vertically, means to adjust the aim of said unit horizontally, and operating-means common to both said adjusting-means.

12. The novel features in headlight-testers set forth in claim 7, and in which the known headlight-tester has in addition a main-support, means to adjust the aim of said unit vertically, means to adjust the aim of said unit horizontally, the additional novel features being that said two adjusting-means include an upright, horizontally-slotted plate vertically-slidable on said main-support, a manually-operated knob having a portion thereof slidable in said plate-slot, motion-reducing means connecting said knob with said main-support and with said unit, whereby vertical movement of said knob slides said plate vertically and tilts said unit vertically and sidewise movement of said knob in said plate-slot varies the side-aim of said unit, said graduated-means showing the various adjusted aim positions of said unit including (a) a vertical-aim scale in erect position on said main-support and an index on said plate coacting therewith, and (b) a horizontal-aim scale parallel to said plate-slot and an index on said knob coacting therewith.

13. The novel features in headlight-testers set forth in claim 7 including the additional novel features that said optical-means is a concave-mirror, that said adjustable support includes a housing carrying said concave-mirror and said cells in fixed relation to one another as the unit, and that said housing has a window at one end with said concave-mirror inside the housing at the opposite end thereof and with the cell-means at the window-end of said housing.

ALBERT R. SQUYER.